United States Patent [19]
Ninomiya et al.

[11] Patent Number: 5,732,680
[45] Date of Patent: Mar. 31, 1998

[54] FUEL INJECTION CONTROL SYSTEM FOR ENGINE

[75] Inventors: Hiroshi Ninomiya, Hiroshima; Tetsushi Hosokai, Kure, both of Japan

[73] Assignee: Mazda Motor Corporation, Hiroshima, Japan

[21] Appl. No.: 700,767

[22] Filed: Aug. 15, 1996

[30] Foreign Application Priority Data

Aug. 16, 1995 [JP] Japan ................... 7-231995
Jul. 15, 1996 [JP] Japan ................... 8-205218

[51] Int. Cl.$^6$ ................ F02D 17/00; F02D 41/30
[52] U.S. Cl. ................ 123/481; 60/285; 180/197
[58] Field of Search ................ 123/481; 60/285; 180/197

[56] References Cited

U.S. PATENT DOCUMENTS

| 5,287,279 | 2/1994 | Anan ................ 123/481 X |
| 5,540,204 | 7/1996 | Schnaibel et al. ........ 123/481 |

FOREIGN PATENT DOCUMENTS 61-76143  5/1986  Japan.
3-202641  9/1991  Japan.

*Primary Examiner*—Tony M. Argenbright
*Attorney, Agent, or Firm*—Sixbey, Friedman, Leedom & Ferguson, P.C.; Gerald J. Ferguson, Jr.; Donald R. Studebaker

[57] ABSTRACT

A fuel injection control system for controlling fuel delivery a necessary amount of fuel according driving conditions through at least leading and trailing fuel injections for each of cylinders every cycle in a specified range of driving conditions and executes fuel cut-off control according to a fuel cut-off pattern upon an occurrence of a demand for an engine torque drop starts said fuel cut-off control from when injection timing for leading fuel injection of a cylinder is reached first after the occurrence of the torque drop command.

10 Claims, 5 Drawing Sheets

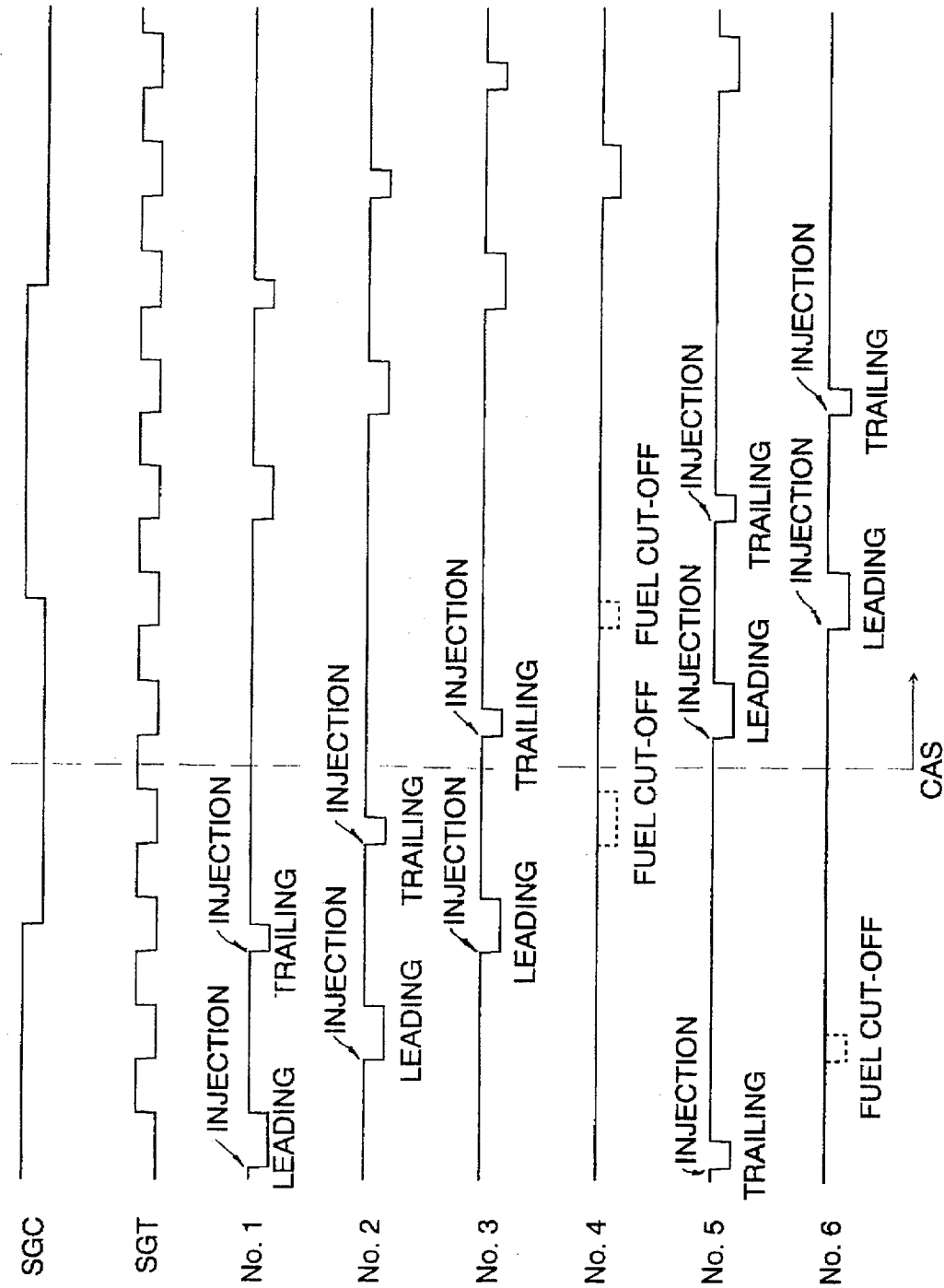

FUEL INJECTION CONTROL SYSTEM FOR ENGINE

BACKGROUND OF THE INVENTION

1. Field of the Invention

The present invention relates to a control system for controlling fuel injection, and, more particularly, to a fuel injection control system which execute a necessary amount of fuel injection through a plurality of times of fuel injection for each of a plurality of cylinders every cycle in a specified range of driving conditions and cuts off fuel delivery to specific cylinders so as to cause a drop in engine output torque during, for instance, an occurrence of wheel slippage.

2. Description of Related Art

Multi-cylinder engines encounter a demand for a drop in engine output torque according to various external conditions during driving. For example, in order for automobiles under acceleration to restrain slippage of driving wheels, it is effective to cause a drop in engine output torque according to the wheel slippage. An egging output torque drop is typically produced by traction control in which ignition timing is retarded or fuel delivery to some cylinders is momentarily cut off. For example, the traction control described in, for instance, Japanese Unexamined Patent Publication No.3-202641, cuts off fuel delivery to specific cylinders according to fuel cut-off patterns prepared for various slippage magnitude.

Apart from the traction control, there have been known fuel injection systems which makes fuel delivery into each cylinder through multi-fuel injection, namely, for instance leading and trailing fuel injection, every cycle. One of the fuel injection systems of this type, as described in, for instance, Japanese Unexamined patent Publication No.61-76143, teaches that proportions of leading injection and trailing injection are varied according to engine loads and intake air temperatures in order to expedite fuel evaporation and maintain combustion stability.

Multi-fuel injection can be employed with an effect not only of expediting fuel evaporation but also of enabling improved fuel efficiency through stratified charge combustion under low engine loads and increased engine output torque through uniform combustion under high engine loads to be consistent with each other by controlling timing and proportions of leading and trailing fuel injection. However, in cases where both multi-fuel injection and the traction control in which some of the cylinders are subjected to fuel cut-off upon an occurrence of a demand for an engine output torque drop are executed, if the an engine torque drop demand occurs at a time between leading and trailing fuel injection for a specific cylinder to which fuel cut-off is directed, only fuel delivery to the cylinder through the trailing fuel injection is cut off, which causes a misfire and produces unburned gas emission including hydrocarbons (HC) from fuel delivered through the leading fuel injection. The hydrocarbon (HC) emission reacts a catalyst of the converter, generating an increase in the temperature of the catalytic converter and aggravation of the reliability of the catalytic converter. Contrary, when the engine is required to recover its output torque in response to termination of the traction control at a time between leading and trailing fuel injection, there are apprehensions for a misfire which leads to an increase in catalyst temperature.

SUMMARY OF THE INVENTION

It is an object of the present invention to provide a fuel injection control system which can prevent a misfire even, when while multi-fuel injection is executed, fuel cut-off takes place to cause an engine output torque drop and fuel cut-off is interrupted to recover necessary engine output torque.

It is another object of the present invention to provide a fuel injection control system which can prevent aggravation of emission control and aggravation of the reliability of a catalytic converter due to overheated catalyst even when, while multi-fuel injection is executed, fuel cut-off takes place to cause an engine output torque drop and fuel cut-off is interrupted to recover necessary engine output torque.

The aforesaid objects of the invention are achieved by providing a fuel injection control system which delivers a necessary amount of fuel through at least leading fuel injection and trailing fuel injection for each cylinder every cycle in a specified range of driving conditions and changes a fuel cut-off pattern in which one or more the cylinders are differently designated as fuel cut-off cylinder according to a demand for a drop in output torque of a multi-cylinder engine. The fuel injection control system changes the fuel cut-off pattern according to a specified driving condition, such as wheel slippage which may be monitored based on rotational speeds of front and rear wheels, in response to an occurrence of a torque drop command, for instance, during traction control, and executes fuel cut-off control to cut off fuel delivery to the designated cylinders starting from when a time of the leading fuel injection is encountered directly after an occurrence of the torque drop command.

With the fuel injection system, because, even if a torque drop command occurs at a time between leading and trailing fuel injection for a cylinder which is designated as a fuel cut-off cylinder, fuel delivery through the trailing fuel injection is executed irrespective of the presence of the torque drop command, there are no apprehensions for a misfire which leads to an increase in catalyst temperature and aggravation of hydrocarbon emission control.

In cases where an engine output torque drop is required to prevent shocks due to a gear shift, the fuel cut-off pattern may be fixed. In such a case, if a torque drop command occurs at a time between leading and trailing fuel injection for a cylinder which is designated as a fuel cut-off cylinder, the fuel cut-off control is performed according to the fuel cut-off pattern only after execution of fuel delivery through the trailing fuel injection irrespective of the occurrence of the torque drop command.

Further, in cases where an engine output torque drop is required during traction control to restrain slippage of driving wheels, the fuel cut-off pattern may be altered according to magnitudes of the wheel slippage. In order to increase the responsiveness of engine torque drop upon an occurrence of a torque drop command, the fuel cut-off control is executed to cut off fuel delivery to the designated cylinders starting from when a time of the leading fuel injection is encountered directly after then occurrence of the torque drop command.

The fuel injection control system may execute the fuel cut-off control when a temperature of a catalytic converter is higher than a specified temperature with an effect of suppressing aggravation of engine torque drop efficiency.

BRIEF DESCRIPTION OF THE DRAWINGS

The above and other objects and features of the invention will be clearly understood from the following description with respect to a preferred embodiment thereof when considered in conjunction with the accompanying drawings, in which:

FIG. 5 is a time chart of leading and trailing fuel injection when the engine output torque is recovered.

DETAILED DESCRIPTION OF THE PREFERRED EMBODIMENTS

Figure 1:
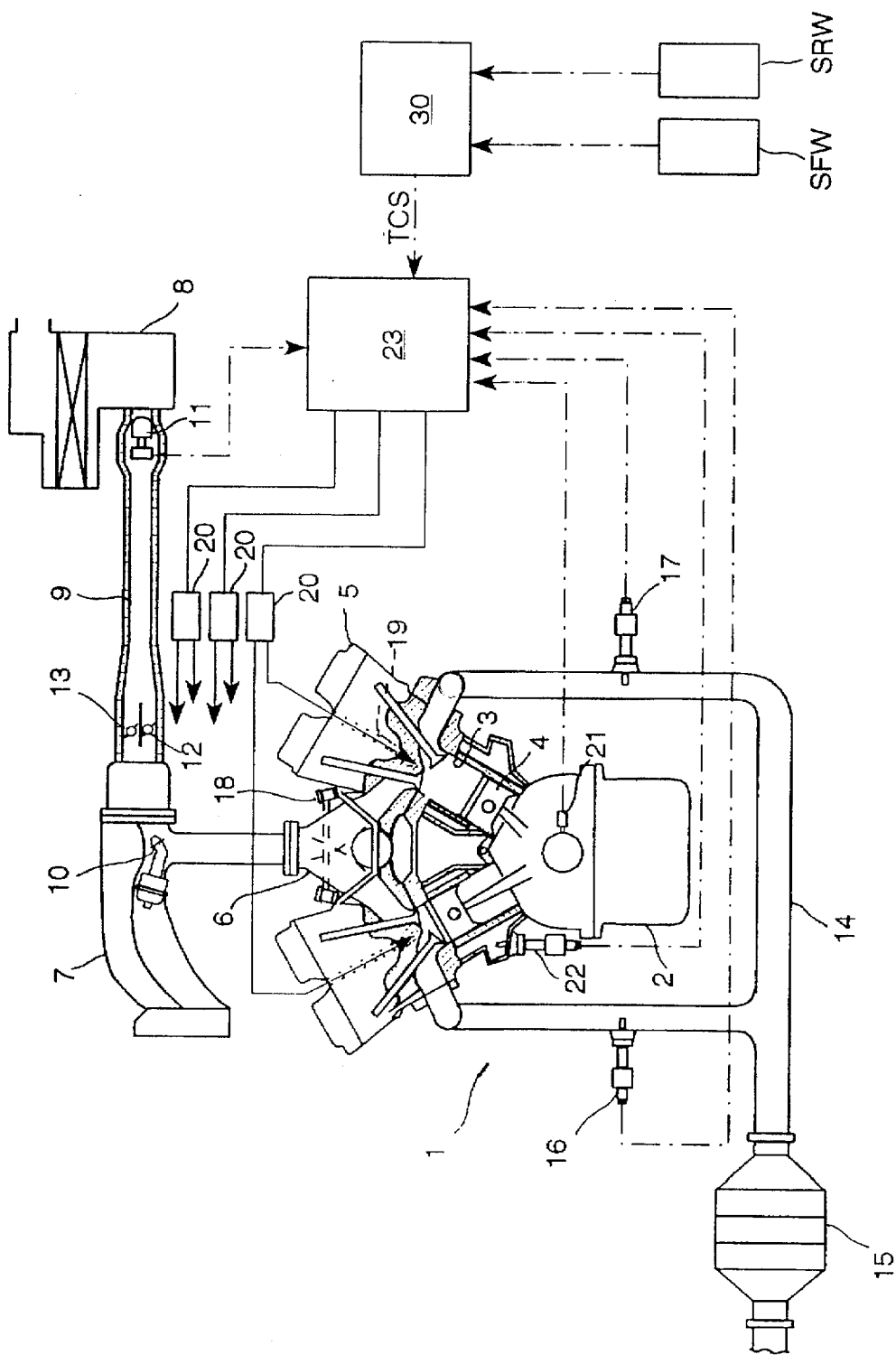
FIG. 1 is a schematic illustration of a V-type, six-cylinder internal combustion engine equipped with a fuel injection control system in accordance with a specific embodiment of the invention.

Referring to the drawings in detail, in particular, to FIG. 1, a V-type, six-cylinder internal combustion engine 1 having a control system in accordance with a specific embodiment of the invention is shown, includes a cylinder block 2, consisting of left and right cylinder banks arranged in a v-formation with a predetermined relative angle, and a cylinder head 5 covering the top of the cylinder block 2. Each cylinder bank is provided with three cylinders 3 in which pistons 4 can slide. An intake manifold 6 is mounted on the cylinder head 5 and connected to one end of a variable intake pipe 7 which varies its air passage. This intake manifold 6 has two rows of individual pipe sections branching off therefrom through which intake air is delivered into the respective cylinders 3. The variable intake pipe 7 is connected at another end to an upstream intake pipe 9 provided with an air cleaner 8. A valve 10 is installed in the variable intake pipe 7 so as to selectively provide a long air passage and a short air passage in the variable intake pipe 7 according to ranges of rotational speeds of the engine. The upstream intake pipe 9 is provided at its upstream end with an air flow sensor 11 at a point in close proximity to the air cleaner 8 and at its downstream end with throttle valves 12 and 13.

Cylinder head 5 is further provided with exhaust manifolds 14 one for each cylinder bank. These exhaust manifolds 14 extend laterally outside over the cylinder banks, respectively and join together their downstream portions. The exhaust manifold 14 at a portion downstream from the juncture is provided with a catalytic converter 15. The respective individual portions of the intake manifold 14 at points upstream from the juncture are, respectively provided with oxygen ($O_2$) sensors 16 and 17 which detect the oxygen content of the exhaust based on which a proper air-to-fuel ratio is determined. Fuel injectors 18 are installed to the intake manifold 6 at a juncture to the cylinder head 5 one for each cylinders 3. Spark plugs 19 are installed to the cylinder head 5 to project into the combustion chambers formed in the cylinders 3, respectively. These park plugs 19 are grouped into three pairs, and the respective pairs of spark plugs 19 are separately connected to ignition coils 20.

Engine 1 is equipped with a speed sensor 21 and a temperature sensor 22. The speed sensor 21 monitors an angle of engine crankshaft rotation to provides a crank-angle signal (SGT) representative of a specified angle of crankshaft rotation near top-dead center and a revolution signal (SGC) based on which a speed of engine rotation is determined. The temperature sensor 22 monitors the temperature of engine cooling water. The control system has an engine control unit 23 comprising a microcomputer, These air flow sensor 11, oxygen sensors 16 and 17, speed sensor 21 and temperature sensor 22, all of which are well known in structure and operation and may take any types well known in the art, transmit signals to the engine control unit 23. Further, an anti-lock brake system (not shown) having a traction control unit 30 monitors the speed difference dv between rotational speeds of front and rear wheels, which represents wheel slippage, and provides a torque drop command signal (TCS) for the engine control unit 23 according to slippage magnitude. Based on all these incoming signals the computer is constantly adjusting the mixture setting and ignition timing so as to deliver a correct air-to-fuel ratio for any given engine command.

The control of the amount of fuel and ignition timing is basically executed as follows.

When the amount of fuel according to an engine demand is large, fuel injection is divided into two separate injection, namely leading fuel injection made at a crank angle, for instance, 367° before top dead center in an intake stroke and trailing fuel injection made at a crank angle, for instance, 127° before top dead center in the intake stroke, every cycle. Proportions of these leading and trailing fuel injection are determined based on the amount of fuel according to an engine demand. The demanded amount of fuel is computed based on an basic amount of fuel added by a correctional amount according to the temperature of engine cooling water and, if an engine operating condition meets requirements for execution of the air-to-fuel ratio feedback control, a correctional amount for air-to-fuel ratio feedback determined according to output of the oxygen sensors 16 and 17. In this instance, the basic amount of fuel is computed based on the rotational speed of engine and the amount of intake air. The air-to-fuel ratio feedback correction value is added only when an engine operating condition for execution of the air-to-fuel feedback control, such as when the temperature of engine cooling water exceeds a specified temperature in a specific feedback range of low or moderate engine loads. If the demanded amount of fuel is less than the rated amount of trailing fuel injection, fuel is entirely delivered within a period of an intake stroke through the trailing injection. If the demanded amount of fuel is greater than the rated amount of trailing fuel injection, the amount of fuel equal to the difference is allocated to the leading fuel injection. The engine control unit 23 generates pulses having pulse width corresponding to the amounts of fuel allocated to the leading and the trailing fuel injection, respectively, and pulses the fuel injector 18 to intermittently deliver fuel.

Ignition timing is determined by use of a timing map defined with respect to engine speed and air charging efficiency. The engine control unit 23 provides an ignition signal responding to which the ignition coil 20 is pulsed at the timing.

Upon an occurrence of wheel slippage, the engine control unit 23 receives a torque drop command signal (TCS) for traction control from the traction control unit 30 and cuts off fuel delivery to specific cylinders designated by a fuel cut-off pattern defined according to a level of torque drop necessary to make the slippage decline and resumes fuel delivery to the specific cylinders when the slippage attains specified magnitude. In cases where, during the traction control, a torque drop command signal (TCS) occurs at a time between leading and trailing fuel injection for a specific cylinder designated as a fuel cut-off cylinder, the fuel cut-off control practically starts at a time of leading fuel injection for a specific cylinder designated as a fuel cut-off cylinder is reached first after the occurrence of the torque drop command signal (TCS). In order to prevent leakage, the cylinders designated as fuel cut-off cylinders by a fuel cut-off pattern are prevented from being ignited.

Figure 2:
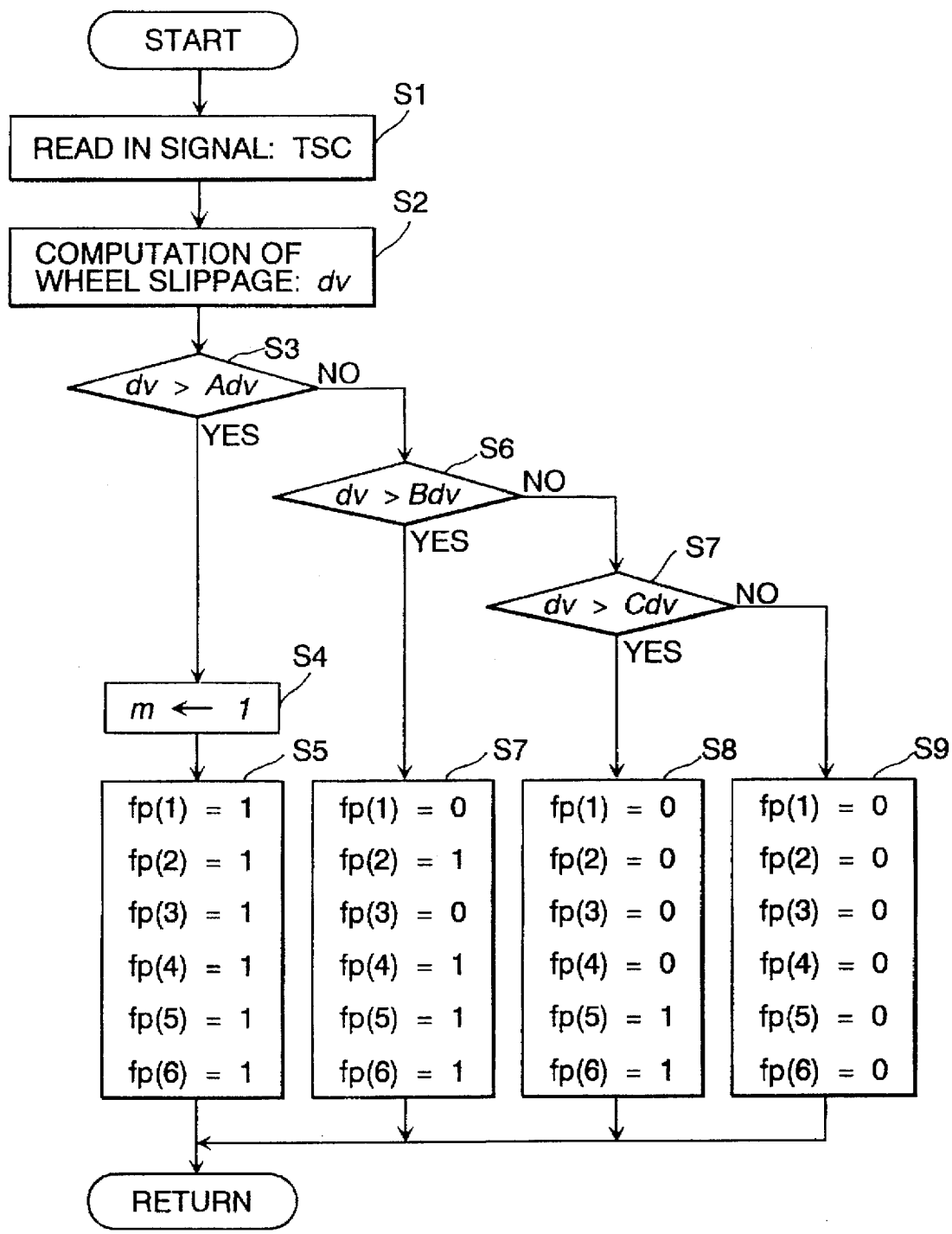
FIG. 2 is a flowchart illustrating a sequence routine of altering a fuel cut-off pattern.

Referring to FIG. 2, which shows a flowchart illustrating a fuel cut-off pattern selection sequence routine for the microcomputer of the engine control unit 23, after reading in signals indicating rotational speeds of the front and rear wheels, which are monitored by speed sensors SFW and SRW, through the traction control unit 30 at step S1, a speed difference between the speeds of the front and rear wheels is computed as wheel slippage dv at step S2. Subsequently, a determination is made at step S3 as to whether the wheel slippage dv has exceeds a first specified magnitude Adv which is a threshold value for execution of the traction control. When the wheel slippage is less than the first threshold magnitude Adv, the traction control is unnecessary, then, after resetting the count Cm of a traction control counter to 1 (one) at step S4, a no-fuel cut-off pattern in which all of the injector 18 are forced to inject fuel into all of the respective cylinders 3 is selected at step S5. In this instance, various fuel cut-off patterns are defined by combinations of injection execution flags fp(m) set up and down for the fuel injectors 18 of the first to sixth cylinders 3 assigned fuel cut-off pattern numbers m, respectively. A specific injection execution flag fp(m) set up or set to "1" permits a fuel injector 18 to inject fuel so as to deliver fuel into a corresponding specific cylinder 3 having a fuel cut-off pattern numbers m, and a specific injection execution flag fp(m) set down or reset to "0" shuts off an injector 18 to cut off fuel delivery into a corresponding specific cylinder 3 having fuel cut-off pattern numbers m. On the other hand, when the first threshold magnitude Adv is exceeded, the traction control is necessary, then, an appropriate fuel injection pattern is selected according to the magnitude of the wheel slippage dv. Specifically, when the wheel slippage is less than a second threshold magnitude Bdv at step S6, a two-cylinder fuel cut-off pattern in which two specific cylinders, namely in this instance first and third cylinders 3 as counted in order of ignition after the presence of a torque drop command signal (TCS), are subjected to fuel cut-off, is selected at step S7. In greater detail, the two-cylinder fuel cut-off pattern resets down the injection execution flags fp(1) and fp(3) for the cylinders 3 having fuel cut-off pattern numbers 1 and 3 to "0," and sets up the injection execution flags fp(2) and fp(4) through fp(6) for the cylinders 3 having fuel cut-off pattern numbers 2 and 4 through 6, respectively, up to "1". When the wheel slippage dv is rated between the second and third threshold magnitude Bdv and Cdv, a four-cylinder fuel cut-off pattern is selected, where the injection execution flags fp(1) through fp(4) for first through fourth cylinders 3 as counted in order of ignition after the presence of a torque drop command signal (TCS) are set down to "0," and the injection execution flags fp(5) and fp(6) for the fifth and sixth cylinders 3 are up to "1". Further, when the wheel slippage dv exceeds the third threshold magnitude Cdv, an all-cylinder fuel cut-off pattern is selected, where the injection execution flags fp(1) through fp(6) for all of the first through sixth cylinders 3 are set down to "0".

Figure 3:
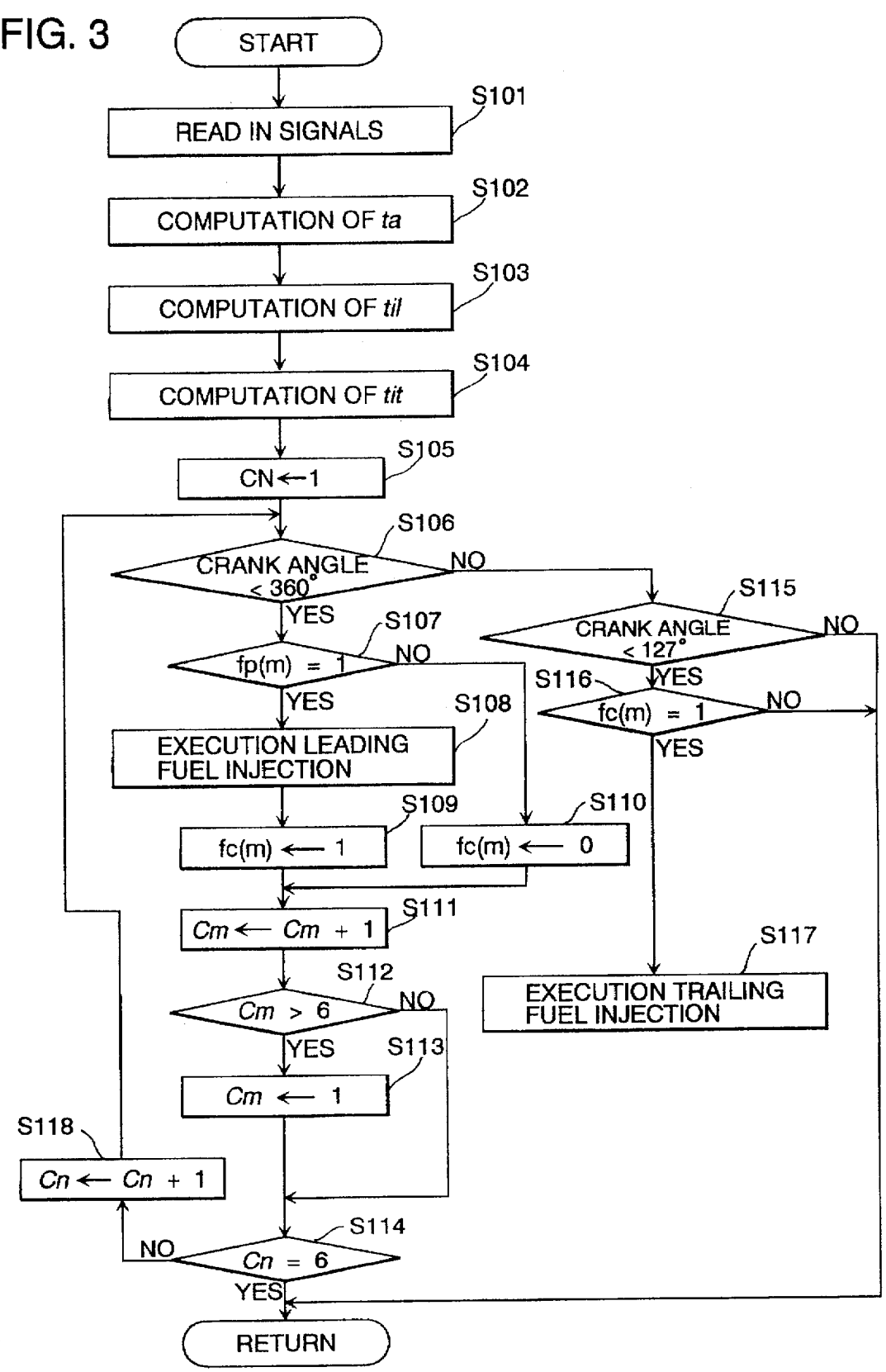
FIG. 3 is a flowchart illustrating a sequence routine of fuel cut-off control according to a fuel cut-off pattern.

FIG. 3 is a flowchart illustrating a fuel injection control sequence routine which is called for in response to a torque drop command signal (TCS). The flowchart logic commences in response to a torque drop command signal (TCS) and control passes directly to function block at S101 where various signals indicating at least engine speed and intake air amount are read in. Subsequently, the demanded amount ta of fuel is computed based on the engine speed and intake air amount at step S102. The amount of fuel til allocated to the leading fuel injection is computed by subtracting the rated amount of trailing fuel injection tit from the demanded amount of fuel at step S103, and the rated amount of trailing fuel injection tit is fixed as an eventual amount of trailing fuel injection at step S104. After resetting the count Cn of a time counter to 1 (one) at step S105, the fuel injection control is executed for the respective cylinders in order of ignition through steps S106–S117.

Figure 4:
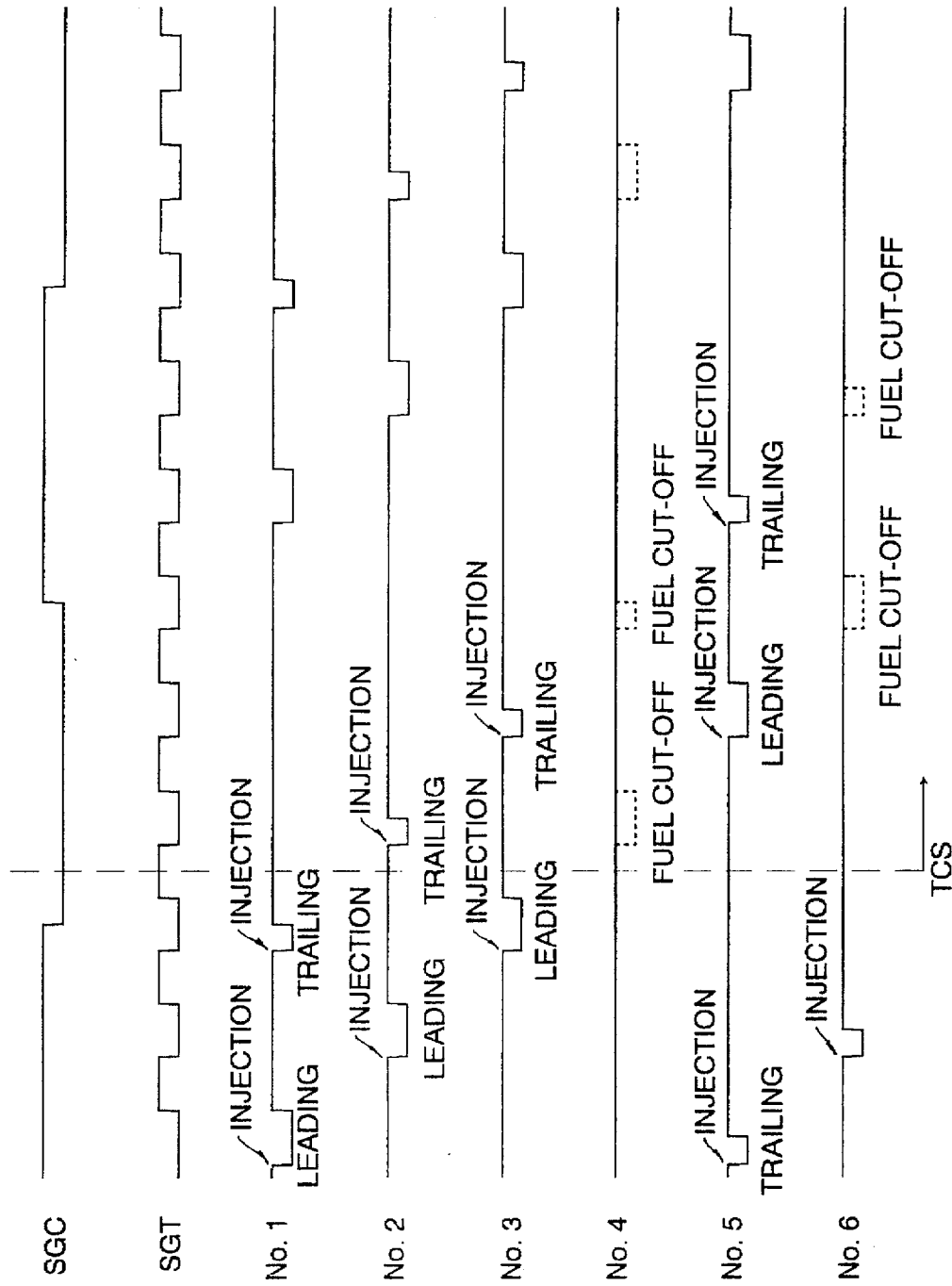
FIG. 4 is a time chart of leading and trailing fuel injection when a drop in engine output torque is caused.

The following description is directed, by way of example, to the case where the two-cylinder fuel cut-off pattern is selected and a torque drop command signal (TCS) appears at a time between leading fuel injection for the third cylinder (No. 3) 3 and leading fuel injection for the fourth cylinder (No. 4) 3 as shown by a time chart in FIG. 4. It is to be noted that the cylinders 3 are designated by ordinary firing order expressed by references numbers No. 1 through No. 6 and, however, assigned fuel cut-off pattern number m in order of leading fuel injection as counted directly after an occurrence of a torque drop command signal (TCS). In cases where a torque drop command signal (TCS) appears after leading fuel injection for the third cylinder (No. 3) 3 but before leading fuel injection for the fourth cylinder (No. 4) 3, the two-cylinder cut-off pattern assigns the fourth (No. 4) cylinder 3 fuel cut-off pattern number m of 1 (one) which indicates the timing of leading fuel injection of the fourth cylinder (No. 4) is encountered first directly after the appearance of the torque drop command signal (TCS). Accordingly, fifth (No. 5) and sixth (No. 6) cylinders 3 are designated by fuel cut-off pattern numbers m of 2 and 3, respectively, and first (No. 1), second (No. 2) and third (No. 3) cylinders 3 are designated by fuel cut-off pattern numbers m of 4, 5 and 6, respectively.

At step S106, a determination is made as to whether it is the time to execute leading fuel injection for a cylinder having a fuel cut-off pattern number m. This determination is executed by monitoring whether a crank angle has reached 367° before top dead center in an intake stroke. When the answer to the determination is "YES," another determination is subsequently made at step S107 as to whether the injection execution flag fp(m) for the cylinder having a fuel cut-off pattern number m has been up or set to 1 (one), which indicates that the injector 18 for the cylinder 3 designated by the fuel cut-off pattern number m must be pulsed to execute leading fuel injection. If the answer to the determination is "YES," then, after pulsing the injector 18 for the cylinder 3 having the fuel cut-off pattern number m to make leading fuel injection at step S108, an injection completion flag fc(m) is set up or set to "1," which indicates that the leading fuel injection for the cylinder 3 having the fuel cut-off pattern number m has been executed, at step S109. On the other hand, if the answer to the determination as to the injection execution flag fp(m) is "NO," this indicates that the leading fuel injection for the cylinder 3 is not permitted, then, at step S110, the injection completion flag fc(m) is reset to "0" which indicates that the leading fuel injection for the cylinder 3 has not been executed. After setting or resetting the injection completion flag fc(m), the fuel cut-off pattern number m is changed by an increment of 1 (one) at step S111. When the fuel cut-off pattern number m is determined to be less than the number of cylinders, i.e., six (6) as a result of a determination made at step S112, or after resetting the fuel cut-off pattern number m to 1 (one) at step S113 when the fuel cut-off pattern number m exceeds the number of cylinders, i.e. six (6) as a result of the determination made at step S112, a determination is made at step S114 as to whether the time counter has counted a count Cn, which indicates the number of times of repetition of the fuel injection control sequence routine, that is, whether the fuel injection control sequence routine has been executed for all of the first to sixth cylinders 3. If the count Cn has exceeded six (6), the fuel injection control sequence routine returns for another control. On the other hand, if the count Cn is less than six (6). after changing the count Cn by an increment of 1 (one) at step S118, the flow chart logic repeats the fuel injection control sequence routine from step S106.

When the crank angle has not reached 367° before top dead center in the intake stroke, a determination is made at step S115 as to whether the crank angle has reached 127° before top dead center in the intake stroke. If the answer to the determination is is "YES," this indicates that it is the time to make trailing fuel injection, then, a determination is subsequently made at step S116 as to whether the injection completion flag fc(m) for a cylinder having a fuel cut-off pattern number m has been up or set to "1," i.e. whether the leading fuel injection has been executed for the cylinder having a fuel cut-off pattern number m. When the answer to the determination is "YES," i.e. the leading fuel injection has been executed for the cylinder, the trailing fuel injection is executed at step S117. However, if the answer to the determination is "NO," this indicates that, while it is the time to make trailing fuel injection for the cylinder having a fuel cut-off pattern number m, the leading fuel injection has not been executed for the same cylinder, then, trailing fuel injection is prohibited for the cylinder having a fuel cut-off pattern number m at step S117.

The flowchart logic repeats steps S106 through S118 in order to execute fuel injection control for the remaining cylinders 3.

A cylinder for which the fuel injection control sequence routine encounters a judgement after an occurrence of the torque drop command signal (TCS) is the second cylinder (No. 2). When it is the time of trailing fuel injection for the second cylinder (No. 2), the determination as to the injection completion flag fc(2) is made at step S116. Because leading injection has been executed for the second cylinder (No. 2) before the occurrence of the torque drop command signal (TCS), the injection completion flag fc(m) has been up, i.e. the answer to the determination made at step S116 is "YES," then, even though the torque drop command signal (TCS) has been presented, the trailing fuel injection is executed for the second cylinder (No. 2) at step S117.

When the time of leading fuel injection has been reached after the fuel injection control for the third cylinder (No. 3), the answer to the determination made at step S107 as to the injection execution flag fp(4) for the cylinder which has a fuel cut-off pattern number m of 1 is "NO". Then, the injection completion flag fc(4) is reset down to "0" at step S110 without executing the leading fuel injection of the injector 18 for the fourth cylinder (No. 4) 3 at step S118. In this way, the fourth cylinder (No. 4) 3 which now has fuel cut-off pattern number m of 1 is shut off from the leading fuel injection. After changing the fuel cut-off pattern number m by an increment of 1 (one), i.e. to 2, at step S111, the determination as to whether the fuel cut-off pattern number m is less than 6 at step S112. Because the fuel cut-off pattern number m is 2, which is less than 6, after increasing the time count Cn by an increment of 1 at step S118 without resetting the fuel cut-off pattern number m to 1 at step S113, the flowchart logic proceeds to step S106.

Because the time of leading fuel injection for the fourth cylinder (No. 4) 3 has passed, the determinations are consecutively made at steps S115 and S116 as to the time of trailing fuel injection and the fuel injection flag fn(4). Because the fuel injection flag fc(4) has been reset down at step S110, the answer to the determination made at step S116 is "NO" irrespective of the time of trailing fuel injection, then, the trailing fuel injection at step S117 is skipped. In this way, the fourth cylinder (No. 4) 3 is shut off from the trailing fuel injection. Accordingly, the fourth cylinder (No. 4) 3 having fuel cut-off pattern number m of 1 is not delivered with fuel at all.

The sixth cylinder (No. 6) having fuel cut-off pattern number m of 3 is shut off from fuel delivery in the same way as described in relation to the fourth cylinder (No. 4) having fuel cut-off pattern number m of 1.

FIG. 5 shows a time chart illustrating a two-cylinder fuel cut-off pattern when a torque drop command signal (TCS) disappears or a torque drop cancellation signal (CAS) occurs at a time between leading fuel injection of fourth cylinder (No. 4) 3 and leading fuel injection of fifth cylinder (No. 5) 3.

When a torque drop command signal (TCS) disappears or a torque drop cancellation signal (CAS) occurs immediately after the leading fuel injection for the fourth cylinder (No. 4) but before the leading fuel injection for the fifth cylinder (No. 5), because the leading fuel injection for the fourth cylinder (No. 4) at step S108 has not executed, and the fuel injection flag fc(4) has been reset down at step S110, the answer to the determination made at step S116 is "NO" irrespective of the time of trailing fuel injection, then, the trailing fuel injection at step S117 is skipped. In this way, the fourth cylinder (No. 4) 3 is still shut off from the trailing fuel injection irrespective of the occurrence of an torque drop cancellation signal (CAS). Thereafter, all of the cylinders properly receive fuel through leading and trailing fuel injections.

Although the fuel injection control shown in FIG. 3 is designed and adapted to be executed in response to a demand for torque drop during the traction control to reduce slippage, it may be executed in torque drop control which is conducted to prevent an occurrence of shift shocks during a gear shift and in which a fuel injection pattern is fixed. In this instance, if a torque drop command signal occurs between leading and trailing fuel injection, the trailing fuel injection immediately after the occurrence of torque drop command signal is executed, and thereafter fuel injection is made in conformity with the fuel cut-off pattern.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fuel injection control system for delivering a necessary amount of fuel according driving conditions through at least two times of fuel injection for each of a plurality of cylinders every cycle in a specified range of driving conditions and executing fuel cut-off control for cutting off fuel delivery to at least one of the cylinders according to a fuel cut-off pattern when there occurs a demand for a drop in output torque of a multi-cylinder engine, said fuel injection system comprising:

driving condition monitoring means for monitoring driving conditions and providing a torque drop command when detecting a specified driving condition which requires a drop in output torque of said multi-cylinder engine;

injection timing monitoring means for monitoring injection timing to cause each of said fuel injection; and injection control means for starting said fuel cut-off control according to said fuel cut-off pattern from when said injection timing monitoring means monitors said injection timing for a first one of said fuel injection directly after an occurrence of said torque drop command.

2. A fuel injection control system for injecting a necessary amount of fuel through at least leading fuel injection and trailing fuel injection for each of a plurality of cylinders every cycle in a specified range of driving conditions and executing fuel cut-off control for cutting off fuel delivery to at least one of the cylinders according to a fuel cut-off pattern when there occurs a demand for a drop in output torque of a multi-cylinder engine, said fuel injection system comprising:

driving condition monitoring means for monitoring driving conditions and providing a torque drop command when detecting a specified driving condition which requires a drop in output torque of said multi-cylinder engine;

injection timing monitoring means for monitoring injection timing to cause each of at least said leading fuel injection and said trailing injection is made; and injection control means for changing said fuel cut-off pattern according to said specified driving condition in response to said torque drop command and starting said fuel cut-off control according to said fuel cut-off pattern from when said injection timing monitoring means monitors said injection timing for a first one of said fuel injection directly after an occurrence of said torque drop command.

3. A fuel injection control system as defined in claim 2, wherein, said injection control means, when said torque drop command occurs at a time between said leading fuel injection and said trailing fuel injection for a specific cylinder, starts said fuel cut-off control according to said fuel cut-off pattern from when said injection timing monitoring means monitors said injection timing for leading fuel injection directly after an occurrence of said torque drop command.

4. A fuel injection control system as defined in claim 2, wherein said fuel injection control means changes said fuel cut-off pattern such that one of said cylinders for which said leading fuel injection be made directly after an occurrence of said torque drop command is designated as a fuel cut-off cylinder for which fuel delivery is cut off.

5. A fuel injection control system as defined in claim 2, wherein said fuel injection control means executes said fuel cut-off control when said driving condition monitoring means detects a temperature of a catalytic converter of an exhaust system of said multi-cylinder engine higher than a specified temperature.

6. A fuel injection control system for delivering a necessary amount of fuel according driving conditions through at least two times of fuel injection for each of a plurality of cylinders every cycle in a specified range of driving conditions and executing fuel cut-off control for cutting off fuel delivery to at least one of the cylinders according to a fuel cut-off pattern when there occurs a demand for a drop in output torque of a multi-cylinder engine, said fuel injection system comprising:

driving condition monitoring means for monitoring driving conditions and providing a torque drop command when detecting a specified driving condition which requires a drop in output torque of said multi-cylinder engine;

injection timing monitoring means for monitoring injection timing to cause each of said fuel injection; and injection control means for starting said fuel cut-off control according to said fuel cut-off pattern from when said injection timing monitoring means monitors said injection timing for a first one of said fuel injection directly after an occurrence of said torque drop command and interrupting said fuel cut-off control from when said injection timing monitoring means monitors said injection timing for a first one of said fuel injection directly after a disappearance of said torque drop command.

7. A fuel injection control system as defined in claim 6, wherein said fuel injection control means executes said fuel cut-off control when said driving condition monitoring means detects a temperature of a catalytic converter of an exhaust system of said multi-cylinder engine higher than a specified temperature.

8. A fuel injection control system for injecting a necessary amount of fuel through at least leading fuel injection and trailing fuel injection for each of a plurality of cylinders every cycle in a specified range of driving conditions and executing fuel cut-off control for cutting off fuel delivery to at least one of the cylinders according to a fuel cut-off pattern when there occurs a demand for a drop in output torque of a multi-cylinder engine, said fuel injection system comprising:

driving condition monitoring means for monitoring driving conditions and providing a torque drop command when detecting a specified driving condition which requires a drop in output torque of said multi-cylinder engine;

injection timing monitoring means for monitoring injection timing to cause each of at least said leading fuel injection and said trailing injection is made; and injection control means for changing said fuel cut-off pattern according to said specified driving condition in response to said torque drop command, starting said fuel cut-off control according to said fuel cut-off pattern from when said injection timing monitoring means monitors said injection timing for a first one of said fuel injection directly after an occurrence of said torque drop command, and interrupting said fuel cut-off control from when said injection timing monitoring means monitors said injection timing for a first one of said fuel injection directly after a disappearance of said torque drop command.

9. A fuel injection control system as defined in claim 8, wherein, said injection control means, when said torque drop command occurs at a time between said leading fuel injection and said trailing fuel injection for a specific cylinder, starts said fuel cut-off control according to said fuel cut-off pattern from when said injection timing monitoring means monitors said injection timing for leading fuel injection directly after an occurrence of said torque drop command.

10. A fuel injection control system as defined in claim 8, wherein said fuel injection control means changes said fuel cut-off pattern such that one of said cylinders for which said leading fuel injection be made directly after an occurrence of said torque drop command is designated as a fuel cut-off cylinder for which fuel delivery is cut off.

* * * * *